United States Patent [19]

Eisenmann

[11] Patent Number: 4,818,584
[45] Date of Patent: Apr. 4, 1989

[54] ARRESTING DELAMINATION IN COMPOSITE LAMINATE

[75] Inventor: James R. Eisenmann, Fort Worth, Tex.

[73] Assignee: General Dynamics Corp., Fort Worth, Tex.

[21] Appl. No.: 128,027

[22] Filed: Dec. 3, 1987

[51] Int. Cl.⁴ ............................................. B32B 27/14
[52] U.S. Cl. ..................... 428/148; 244/123; 244/133; 428/105; 428/195; 428/284; 428/294; 428/343; 428/354; 428/355; 428/408; 428/902
[58] Field of Search ............. 428/105, 195, 198, 284, 428/294, 343, 354, 355, 408, 902, 109, 110, 114; 244/123, 133

[56] References Cited

U.S. PATENT DOCUMENTS

| | | | |
|---|---|---|---|
| 3,528,950 | 9/1970 | Lubowitz | 260/78.4 |
| 3,578,544 | 5/1971 | Thorsrud | 161/59 |
| 3,745,149 | 7/1973 | Serafini et al. | 260/65 |
| 3,878,020 | 4/1975 | Huffaker et al. | 156/291 |
| 3,891,490 | 6/1975 | Humphries | 156/295 |
| 3,993,818 | 11/1976 | Novak et al. | 428/294 |
| 4,034,137 | 7/1977 | Hofer | 428/308 |
| 4,166,170 | 8/1979 | St. Clair | 428/474 |
| 4,233,258 | 11/1980 | St. Clair | 264/137 |
| 4,263,367 | 4/1981 | Prewo | 428/902 |
| 4,309,473 | 1/1982 | Minamisawa et al. | 428/902 |
| 4,350,728 | 9/1982 | Huang et al. | 428/105 |
| 4,368,234 | 1/1983 | Palmer et al. | 428/902 |
| 4,406,724 | 9/1983 | Bostian et al. | 156/291 |
| 4,416,929 | 11/1983 | Krueger | 428/102 |
| 4,446,192 | 5/1984 | Dehlen | 428/339 |
| 4,454,184 | 6/1984 | Britton | 428/110 |
| 4,455,186 | 6/1984 | Koehmstedt | 156/91 |
| 4,489,123 | 12/1984 | Schijve et al. | 428/902 |
| 4,496,621 | 1/1985 | Hubert et al. | 428/902 |
| 4,529,645 | 7/1985 | Berg et al. | 428/294 |
| 4,581,284 | 4/1986 | Eggert et al. | 428/902 |
| 4,604,319 | 8/1986 | Evans et al. | 428/290 |
| 4,710,416 | 12/1987 | Barth et al. | 428/354 |

*Primary Examiner*—James J. Bell
*Attorney, Agent, or Firm*—Wofford, Farlst Zobal

[57] ABSTRACT

A method of arresting delamination between and within plies of a composite laminate having layers containing a resin without significantly degrading the structural strength of the laminate characterized by emplacing within a plurality of the laminate layers having a resin, at a plurality of respective discrete locations, narrow strips of a tough adhesive having a fracture toughness greater than the fracture toughness of the resin in the respective layers of laminate. The adhesive has a Mode I critical strain energy release rate in the range of 5 inch pounds per square inch or more; for example, about 10 inch pounds per square inch. Also disclosed is a preferred method of constructing the laminate to employ this invention.

6 Claims, 3 Drawing Sheets

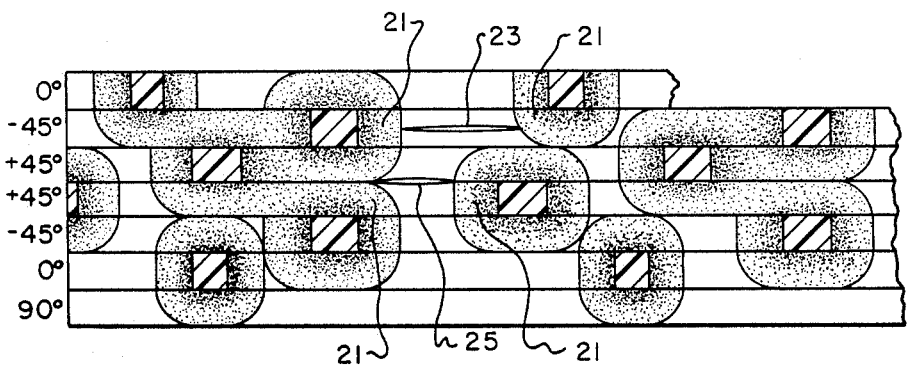
Fig. 3
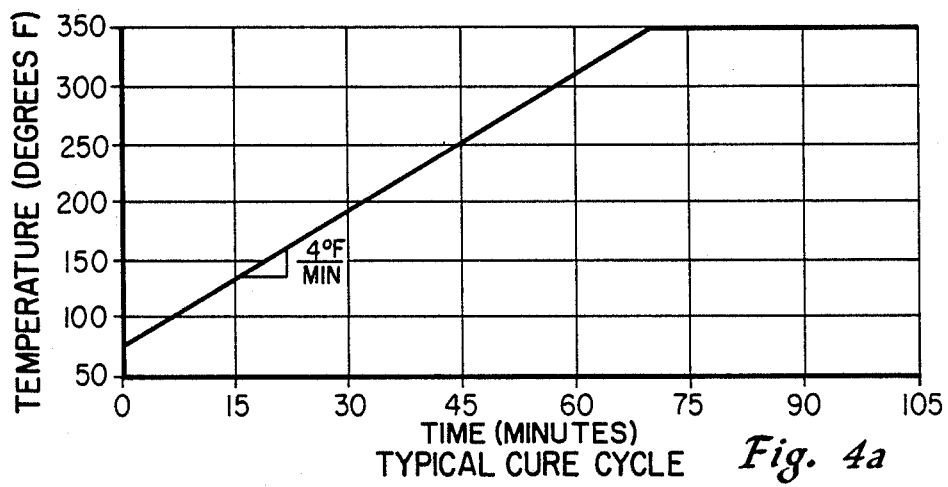
TYPICAL CURE CYCLE   Fig. 4a
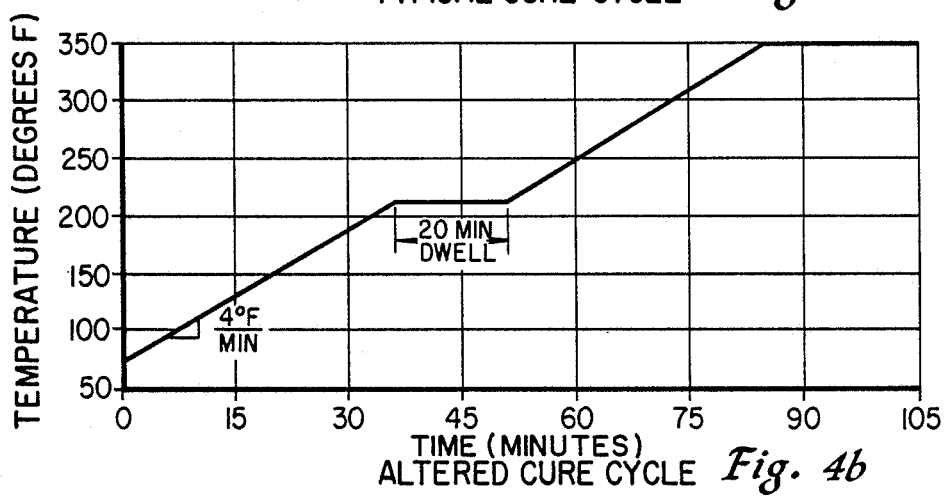
ALTERED CURE CYCLE   Fig. 4b

ARRESTING DELAMINATION IN COMPOSITE LAMINATE

FIELD OF THE INVENTION

This invention relates to providing high strength multi-layer laminations, as for the aircraft industry. More particularly, this invention relates to providing a means and method for arresting delamination occurring between and within layers of a laminated composite material in such high strength laminate structures.

BACKGROUND OF THE INVENTION

The art of mechanical structures has seen the development of a wide variety of different approaches to try to gain high strength with low weight. Early work was directed toward trying to improve structures made of steel or other high strength metallic components. Later work included the incorporation of low weight metals or the like. Even cellular plastic with reinforced densified plastic skin was tried to gain high strength and low weight, such as for use in aircraft structures or the like. One of the most recent and most successful breakthroughs occurred in the use of laminated composites, also sometimes referred to as composite laminates. In this approach, a lightweight high strength fiber, such as carbon or the like, is included in a resinous matrix to form individual unidirectional layers with all fibers parallel in a given layer and a plurality of the unidirectional layers are put together in order to get the high tensile strength of the filament along various orientational angles. This type of structure has been particularly successful in supersonic aircraft structures, such as wings and the like. One problem, however, has been the delamination in which a delamination fault occurring between layers or within a given layer of the laminated composite material has severely reduced the compressive strength of the composite laminate.

Since the composite laminates are relatively new, the defects, such as the delaminations, and correcting them has not been described in many publications yet. These delaminations often occur during the service life of a structure made from such composite materials and can result in significant loss of strength, as indicated. By arresting the delaminations and thus limiting them to a benign size, this invention allows the structure to perform at the desired level of strength throughout its service life.

The prior art has seen two early methods attempted to correct the delamination. The first method was the placement of stitches of thread-like material through the composite laminate in the thickness direction during the manufacturing process to provide resistance to delamination between layers. The second method was the placement of a continuous film of adhesive between every two layers of composite material to provide resistance to delamination by bonding each layer to its nearest neighbors.

The first method, stitching the layers together, has a disadvantage of reducing the structural properties of composite laminate as a result of the holes created by the stitching process. Both the tensile strength and the compressive strength in the plane of the laminate are seriously degraded as a result of this process.

The second method, placing continuous adhesive film between the layers, is effective for improving delamination resistance for one mode of propagation (the relative motion between the layers in the sliding sense- called Mode II in fracture mechanics terminology), but offers no improvement in delamination resistance or the other mode of propagation (peeling apart of the layers from each other- called Mode I in fracture mechanics terminology).

It is desirable that the method of arresting delamination be effective in both Mode I and Mode II increasing the resistance of delamination without causing significant degradation in the in-plane strength property of a composite laminate.

Yet, the prior art has now provided a method of effecting such desired end result.

BRIEF DESCRIPTION OF THE DRAWINGS

FIG. 3 is an enlarged cross-sectional view of the embodiment of FIG. 2b showing the arresting of inter-layer delamination, as well as intra-layer delamination, by the tough adhesive strip and its diffusion out into the resinous matrix holding the fibers.

FIG. 4a is a graph, or plot, showing a typical cure cycle, with temperature (°F.) on the y-axis and time (minutes) on the x-axis.

FIG. 4b is a graph, or plot, showing an altered cure cycle, with the same y-axis and x-axis.

SUMMARY OF THE INVENTION

Accordingly, it is an object of this invention to provide a method of arresting delamination in composite laminate structures that is effective in both Mode I and Mode II facets.

It is a specific object of this invention to provide a method of arresting delamination, whether inter-layer or intra-layer that is effective in both Mode I and Mode II and that does not significantly degrade the in-plane strength properties of the composite laminate.

These and other objects will become apparent from the descriptive matter hereinafter, particularly when taken in conjunction with the appended drawings.

In accordance with one embodiment of this invention, there is provided a method of arresting delamination between and within layers of a composite laminate having layers containing a resin without significantly degrading the structural strength of the laminate comprising emplacing within a plurality of the laminated layers, at a plurality of respective discrete locations, narrow strips of a tough adhesive having a fracture toughness greater than the fracture toughness of the resin in the respective layers of laminate.

In another embodiment, this invention provides a composite laminate having increased resistance to propagation of delamination characterized by a plurality of discrete layers of laminate, each having resin and a plurality of longitudinally oriented fibers of a high tensile strength, lightweight component, the fibers being oriented in respective layers at predetermined respective angles; having a plurality of narrow strips of a tough adhesive having a fracture toughness greater than the fracture toughness of the resin in respective layers of laminate; and having a diffused region disposed about each strip of adhesive, the diffused region comprising a thickness at least as great as the thickness of the adjacent layer of laminate such that any delamination, either inter-layer or intra-layer, will be arrested and not be propagated.

DESCRIPTION OF PREFERRED EMBODIMENTS

This invention may have usefulness in other areas of technology. It was developed, however, in the technology of aircraft fabrication and, in particular, using the lightweight, exceptionally strong, laminate composites to form structural components such as wings and the like in aircraft. Accordingly, it is in this area of technology that the invention will be described hereinafter.

Figure 1A:
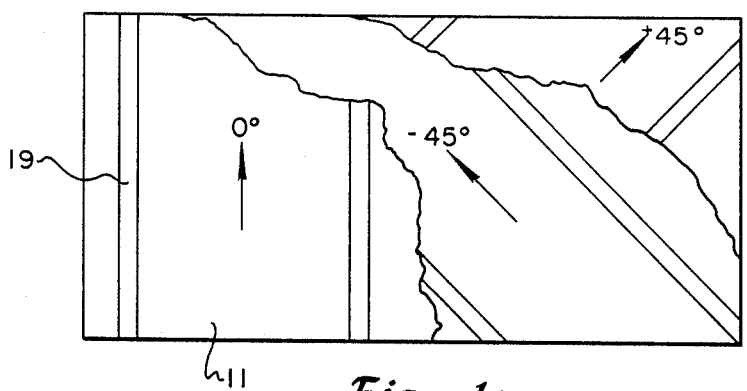
FIG. 1 is a plan view showing placement of strips of unidirectional layers adjacent strips of adhesive in accordance with one aspect of this embodiment.
FIG. 1b is an end view of the composite laminate with the respective layers of FIG. 1a, showing angles at which the respective strips are emplaced in the composite laminate.
FIG. 1c shows a partial cross-sectional view from the end showing the parallel reinforcing fibers of the lightweight material having high tensile strength embedded in the resin.
Figure 1B:
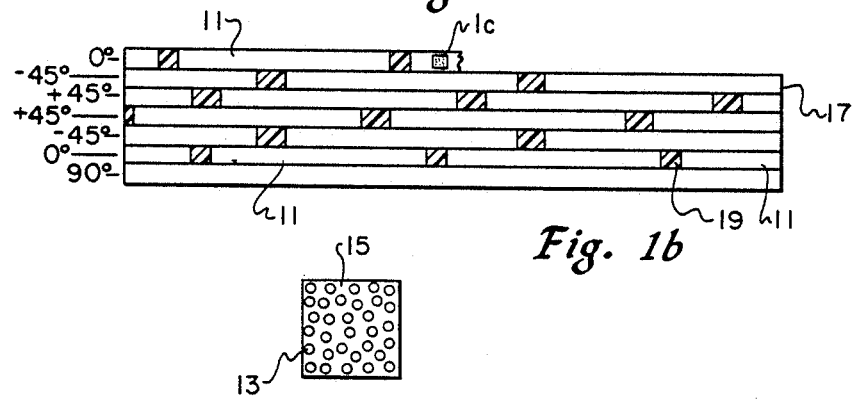
Figure 1C:
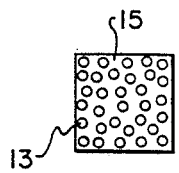
Figure 2A:
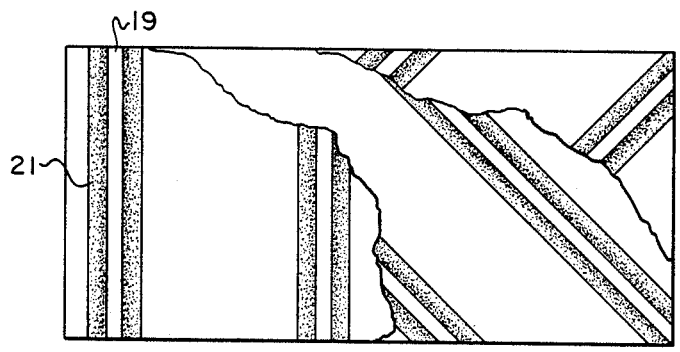
FIG. 2a illustrates a plan view of the embodiment of FIG. 1a showing the diffusion of the adhesive laterally from the strip of adhesive.
Figure 2B:
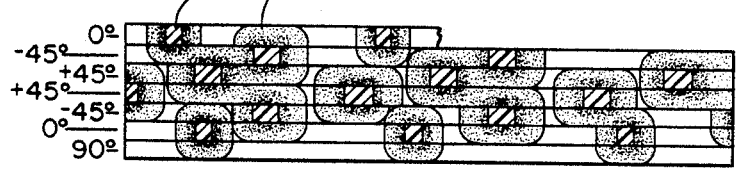
FIG. 2b shows a cross-sectional view of the laminate structure specifically showing the diffusion of the adhesive away from the central strip of adhesive.

Referring to FIGS. 1a, 1b and 1c, a plurality of strips of unidirectional tape 11 are oriented in each respective layer at various respective angles; such as, zero degrees, minus forty-five degrees, and plus forty-five degrees. The strips of tape 11 are composed of unidirectional fibers 13, FIG. 1c, embedded in a resinous matrix 15. These fibers are of structurally strong material such as filamentary carbon or the like. Expressed otherwise, the fibers, or filamants, have high tensile strength. The resin will comprise the usual high temperature resins conventionally employed in this art. Typical resins are those described in U.S. Pat. No. 4,604,319. This patent describes some recognized needed properties and the resins that give these properties. Such resins include the epoxy resins, polyimide resins, bis maleimide resins and acetylene terminated resins. Glycidil esters of polyhydric alcohols can be employed if desired. Satisfactory polyimides are delineated in U.S. Pat. Nos. 3,528,950; 3,745,149; 4,233,258; and 4,166,170. U.S. Pat. No. 4,604,319 describes satisfactory bis maleimide resins and acetylene-terminated resins. This invention can employ any of the conventional laminating resins that have the strength for holding the high strength fibers in the desired orientation and without softening at the higher temperatures that may be encountered, as in supersonic aircraft. Conventionally each layer 17, FIG. 1b, will be comprised of a plurality of strips of tape, which may be about three or four inches wide. A type of prefabricated tape is frequently referred to as prepreg tape and may be, for example, three inches wide. Narrow strips of adhesive 19 that have a fracture toughness greater than the resin are employed intermediate the strips of tape 11 in forming each respective layer. During the application of increased temperature required to cure the prepreg tape, the viscosities of both the laminating resin and the adhesive 19 are reduced causing the adhesive to diffuse and mingle with the laminating resin to form the zones, or regions, of increased toughness 21, FIG. 2a and 2b. The extent of adhesive diffusion and mingling with the laminating resin can be controlled to some extent by altering the time-temperature profile used for the cure cycle. For example, as shown in FIGS. 4a and 4b, a typical cure cycle for a graphite-epoxy material system consists of a 4-degree Fahrenheit per minute temperature ramp to the cure temperature of 350 degrees Fahrenheit. The time-temperature profile can be altered by adding a temperature plateau at a temperature at which the adhesive has its lowest viscosity (typically between 200 and 250 degrees Fahrenheit). In the example shown in FIG. 4b, a 20-minute dwell at 215 degrees Fahrenheit was added to the typical time-temperature profile. Such variations in the time-temperature profile allow the extent of adhesive migration and mingling to be tailored for a given combination of laminating resin and tough adhesive to achieve the desired amount of adhesive migration and mingling, namely a diffused region with a thickness as great as the individual layer thickness.

This invention can employ any one of the adhesives that have a fracture toughness greater than the resin. The adhesive must have a T-peel strength of 30 pounds per inch (lb./in.) or better. The T-peel test is a recognized test in which test speciment are adhered together and the force required to pull them apart measured. The adhesive must also have metal-to-metal peel strength of 20 lb/in or better. The metal-to-metal peel strength is a recognized test in which metal test specimens are adhered together and the force required to pull them apart measured. In both cases, the higher the numbers, the better is the adhesive. A suitable adhesive has been found to be FM-73, an adhesive available from American Cyanamid Company. It is an epoxy resin modified with a minor amount of added for toughness nitrile rubber and butadiene rubber; and commonly referred to by engineers in this technology as "epoxy adhesive." It has a fracture toughness greater than the fracture toughness of the resin.

Expressed otherwise, the adhesive will have a critical Mode I strain energy release rate, $G_{IC}$, (in energy release per unit area of debonding) in the range of 5 or more inch pounds per square inch. The tougher the adhesive the better will be the results that will be obtained. As is recognized, fracture toughness is a terminology that is employed by engineers in this art. The narrow strip of adhesive may be, for example, about a quarter of an inch or more in width. The adhesive could itself be impregnated into a strip and then the strip could be laid down intermediate the respective strips containing the resin and the high tensile strength fiber if desired. It is probably easier to manufacture the laminate composite with the adhesive strips already incorporated into the respective planes such that the manufacturing process would employ the method of this invention. Any method that would result in the desired high structural strength laminate with the strips of adhesive intermediate respective strips of resin containing the high strength fibers could be employed. Employing this approach, as can be seen in FIG. 3, any delamination such as the intra-layer delamination 23 or the inter-layer delamination 25 is arrested upon reaching the nearest toughened zone 21, or zone of increased toughness formed by diffusion of adhesive into the resinous matrix; and is thereby constrained to a localized region between adjacent toughened zones provided by the adhesive of the respective angled strips of tape 11.

In addition to toughness, there are other factors to consider in the selection of a suitable adhesive. The selected adhesive must be compatible with the cure cycle of the prepreg tape so as not to give off excess volatiles or decompose as a result of the temperatures experienced during the cure and postcure cycles. The selected adhesive must also be chemically compatible with the resin system in the prepreg tape so as not to react chemically during the cure and postcure cycles. The selected adhesive should have a thickness in the uncured state equal to or greater than that of the prepreg tape so that the pressure applied to the prepreg tape during the cure cycle will also be felt by the adhesive and thus promote the desired extent of diffusion and mingling of the adhesive with the laminating resin.

Figure 5:
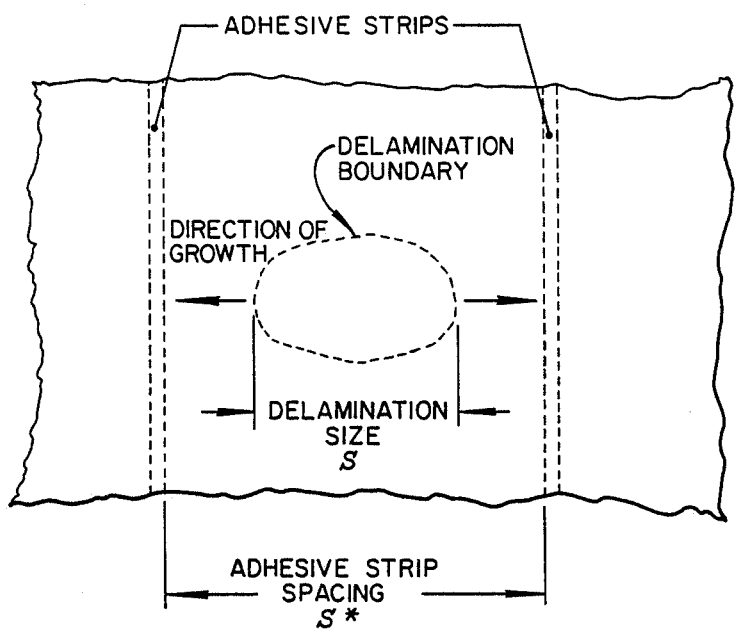
FIG. 5 is a partial schematic view showing spacing and delamination sizes.
Figure 6:
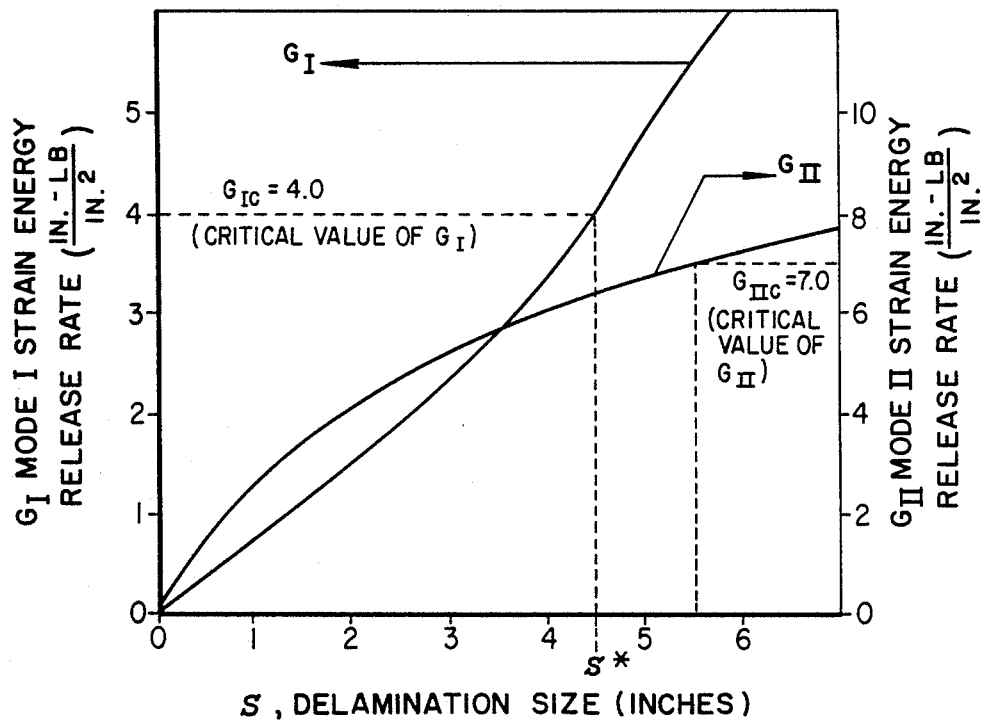
FIG. 6 is a plot of the $G_I$ and $G_{II}$ Mode 1 and Mode II strain release rate (in.-lb./in2) plotted against delamination size (ins.).

The maximum allowable spacing between the adhesive strips can be determined as shown in the following example. FIG. 5 illustrates a plan view of a composite laminate containing adhesive strips spaced S* inches apart where S* is the quantity to be defined. Also shown is a delamination placed midway between two adhesive strips with the direction of growth specified as normal, or perpendicular, to the direction of the adhesive strips. Given this set of conditions, it is possible using state-of-the-art computational techniques to calculate for some critical loading condition, the values of Mode I and Mode II strain energy release rates, $G_I$ and $G_{II}$, respectively, as a function of the delamination size S. The resulting curves defining $G_I$ and $G_{II}$ are shown in FIG. 6. For a value of S equal to 0.0, both $G_I$ and $G_{II}$ are equal 0.0. As S increases, $G_I$ and $G_{II}$ increase in value as shown. At some point, the value of $G_I$ exceeds the critical value, $G_{IC}$, above which the delamination will propagate through the adhesive strip in the opening or peel mode of fracture. Similarly, as $G_{II}$ exceeds the critical value, $G_{IIC}$, the delamination will propagate through the adhesive strip in the sliding or shear mode of fracture. The required adhesive strip spacing is then the biggest value of S (called S*) which does not allow either $G_I$ to exceed $G_{IC}$ or allow $G_{II}$ to exceed $G_{IIC}$. As shown in FIG. 6, S* must be less than or equal to 4.5 inches to prevent Mode I propagation and less than or equal to 5.5 inches to prevent Mode II propagation. In this case, the required value of S* is 4.5 inches. The spacing will be at least one inch apart.

A computational technique for finding values of $G_I$ and $G_{II}$ is discussed in prior art, or state-of-the-art, publications such as:

Rybicki, E. F.; Schmueser, D. W.; and Fox, J. *JOURNAL OF COMPOSITE MATERIALS*, Vol. 2, 1977; p. 470; and Rybicki, E. F. and Kanninen, J. F., *ENGINEERING FRACTURE MECHANICS*, Vol. 9, 1977, p. 931-938. The applications of this computational technique to composite delamination are also discussed in the prior art; such as:

Wilkins, D. J.; Eisenmann, J. R.; Camin, R. A.; Margolis, W. S.; and Benson, R. A., "Characterizing Delamination Growth in Graphite-Epoxy," *DAMAGE IN COMPOSITE MATERIALS*, ASTM STP 775, K. L. Reifsnider, Ed., American Society for Testing Materials, 1982, p. 168-183.

O'Brien, T. K., "Characterization of Delamination Onset and Growth in a Composite Laminate," *DAMAGE IN COMPOSITE MATERIALS*, ATSM STP 775 K. L. Reifsnider, Ed., American Society for Testing Materials, 1982, p. 140-167.

In operation the above described method is implemented by placing adhesive; for example, in the form of a strip about ¼ inch wide; laterally adjacent and preferably abutting each unidirectional tape material at the time of manufacture of a prepreg tape. Prepreg tape can be made by a supplier to a user's specification. This embodiment will have the strips of resin and fiber and intermediate strip of adhesive laterally therebetween. This will allow use of existing automated tape laying equipment that is commonly employed for the manufacturing of composite laminates.

An alternate approach would be to fabricate composite laminates from woven cloth. In this latter alternate type application, the adhesive strips, for example, carrying a carrier yarn suitable for weaving, could be inserted into the cloth during the weaving operation at the desired spacing. During the subsequent cure process, the woven adhesive strips would diffuse, in the same fashion as those described previously to provide delamination arrestment capability.

EXAMPLE I

In this example, a laminate had the strips of adhesive (FM-73) placed side by side with the strips of resin and fiber. It was cut into 1 inch wide test specimens designated AS 1/3502. A typical test specimen was polished and photographed. The American Cyanamid FM-73 adhesive had diffused sufficiently to form blocking toughened areas 21 of the desired extent, such that when the delamination encountered these toughened areas, delamination was stopped.

The mechanical tests that were conducted on the test specimens to test mode I and Mode II insured that the adhesive strips worked. Without the adhesive strips the AS 1/3502 specimens provided a value of $G_{IC}$ equal to 1.13 inch pounds per square inch. With the adhesive strips at the mid-plane, a value of $G_I$ equal to 8.25 inch pounds per square inch was required to drive the delamination through the adhesive strips. Similar results were obtained in tests of the stepped-lap Mode II coupons (six ply zero degrees coupon dropping to three zero degree plies at the step). Without adhesive strips the value of $G_{IIC}$ was equal to 1.65 inch pounds per square inch. With the adhesive strips at the mid-plane, delamination was arrested until a $G_{II}$ value of 8.27 inch pounds per square inch was achieved.

The extent of benefit obtained from the use of adhesive strips is most evident when related to the amount of load carried by the specimen with and without the presence of adhesive strips. The applied load required to cause the delamination with and without adhesive strips is related to the square root of the values of critical strain energy release rate with and without adhesive strips. In this instance, for Mode I delamination, the increase in applied load is equal to the square root of the ratio of 8.25 to 1.13, or 2.70. This means that the presence of adhesive strips allows the applied load to be increased to 270% of the value of applied load that would cause delamination if the adhesive strips were not present. A similar calculation for Mode II delamination shows that the applied load can be increased to 224% of the value of applied load that would cause delamination if the adhesive strips were not present.

From the foregoing it can be seen that delamination arrestment was being effected and that the objects of this invention were achieved by this invention. In particular, both the method of forming the composite laminate and the composite laminate, per se, were demonstrated to be superior to the prior art approaches.

Having thus described the invention, it will be understood that such description has been given by way of illustration and example and not by way of limitation, reference for the latter purpose being had to the appended claims.

What is claimed is:

1. A composite laminate having a plurality of laminate layers containing a resin having embedded therewithin high tensile strength filaments of a light weight component; a plurality of respective narrow strips of tough adhesive at a plurality of respective discrete locations within each layer of laminate, said adhesive having a fracture toughness greater than the fracture toughness of the resin in the respective layers of laminate; and a region of diffused adhesive surrounding each strip of tough adhesive, said region of diffused adhesive having a toughness greater than the fracture toughness of the resin in the respective layers of laminate such that said composite laminate has increased resistance to delamination and any delamination, either inter-layer or intra-layer, will be arrested and contained within a predetermined zone having an aerial extent determined by the respective angles which the respective filaments in the resin in each respective layer are oriented.

2. The composite laminate of claim 1 wherein said filaments in said resin are oriented at respective angles of zero degrees, minus forty-five degrees, plus forty-five degrees, and ninety degrees in the respective layers and wherein each of the respective layers has said plurality of strips of adhesive and regions of diffused adhesive disposed thereabout.

3. The composite laminate of claim 1 wherein the adhesive strips and the composite laminate are cured in addition to normal cure with a dwell time interval of about 20 minutes at a temperature within the range of 200° F.–250° F., inclusive.

4. The composite laminate of claim 3 wherein spacing of adhesive strips and the curing are such that the applied load for Mode I delamination can be increased up to 270% of the value of applied load that would cause delamination if adhesive strips were not present and wherein the applied load can be increased for Mode II delamination up to 224% of the value of the applied load that would cause delamination if adhesive strips were not present.

5. The composite laminate of claim 1 wherein the adhesive strips are spaced no farther apart than about 6.0 inches.

6. The composite laminate of claim 5 wherein the adhesive strips are spaced at least one inch apart and no more than about 4.5 inches apart.

* * * * *